Patented May 21, 1929.

1,713,650

UNITED STATES PATENT OFFICE.

ANTHONY GEORGE, OF NIAGARA FALLS, AND ROBERT B. MacMULLIN, OF LA SALLE, NEW YORK, ASSIGNORS TO THE MATHIESON ALKALI WORKS, INC., OF NEW YORK, N. Y., A CORPORATION OF VIRGINIA.

MANUFACTURE OF CALCIUM HYPOCHLORITE.

No Drawing. Application filed August 4, 1926. Serial No. 127,176.

This invention relates to improvements in the production of calcium hypochlorite products. In the manufacture of calcium hypochlorite products, it is usually desirable to make products that are free from calcium chloride or contain but a minimum of calcium chloride for several reasons. In particular, calcium chloride is very hygroscopic and makes the products difficult to dry when present in substantial amount, and this same property of calcium chloride also tends to make the product unstable when it contains calcium chloride in substantial amount. The present invention provides a method of freeing calcium hypochlorite products from such calcium chloride as they may contain.

According to the present invention, the calcium hypochlorite product containing calcium chloride is treated with sodium hypochlorite. The sodium hyprochlorite reacts with calcium chloride present to convert it to calcium hypochlorite with the formation of sodium chloride. Sodium chloride, unlike calcium chloride, apparently does not adversely affect the stability of calcium hypochlorite, and the calcium hypochlorite formed in the treatment adds to the calcium hypochlorite content of the product. Any tendency to form difficultly soluble basic hypochlorite is also avoided by using sodium hypochlorite, or other alkali hypochlorite.

The process of the invention is applicable to dry calcium hypochlorite products, or to slurries, or to filter or press cakes, or the like, containing calcium hypochlorite and calcium chloride. The treatment is carried out in the presence of sufficient water to enable thorough agitation and mixture of the calcium hypochlorite product with added alkali hypochlorite. With a dry product all of the water necessary to permit adequate agitation must be added, and with a wet product it is necessary to add only the additional amount required to give the requisite total. It is advantageous to employ the present invention at a stage of the process producing the calcium hypochlorite product such that no water, or but a minimum of water, need be added. Following treatment with alkali hypochlorite, the product may be filtered and dried, or dried directly, either with or without pressing.

The alkali hypochlorite may be used as such or in solution in carrying out the invention. The alkali hypochlorite, for example, may be added dissolved in the water, or part of the water, added to permit adequate agitation. As an example, a solution containing sodium hypochlorite may be prepared by chlorinating a solution of 55 pounds of caustic soda dissolved in 65.3 pounds of water until not more than about 6% of the caustic soda added remains unchlorinated. It is then advantageous to separate any precipitated salt. After separation of precipitated salt, such a solution may contain about 29% of sodium hypochlorite, 7.5% of sodium chloride, 1.5% of sodium hydroxide and 62% of water. This solution may then be employed in the treatment of calcium hypochlorite products in accordance with the present invention. If it is desired to avoid the addition of salt and caustic alkali to the calcium hypochlorite product during treatment, a solution of sodium hypochlorite such as that just described may be cooled to freeze out sodium hypochlorite pentahydrate which can be filtered from the solution and employed in treatment of the calcium hypochlorite product. In carrying out the invention, the amount of calcium chloride in the calcium hypochlorite product is first determined and an amount of alkali hypochlorite approximately equivalent chemically to this calcium chloride is then employed in the treatment.

The invention will be illustrated by the following example: 47 pounds of sodium hypochlorite and 73 pounds of water are added to 500 pounds of a filter cake containing about 50.1% of calcium hypochlorite, 6.9% of calcium chloride, 5.7% of calcium hydroxide, 0.3% of sodium chloride and 37% of water and the mixture is thoroughly stirred and dried without pressing. The resulting product contains less than 0.5% of calcium chloride.

We claim:

1. An improvement in eliminating calcium chloride from calcium hypochlorite products containing the same which comprises treating the calcium hypochlorite product containing calcium chloride with an added alkali hypochlorite.

2. An improvement in eliminating calcium chloride from calcium hyprochlorite products containing the same which comprises treating the calcium hypochlorite product containing calcium chloride with added sodium hypochlorite.

3. An improvement in eliminating calcium chloride from calcium hypochlorite products containing the same which comprises treating the calcium hypochlorite product containing calcium chloride with alkali hypochlorite added in amount approximately equivalent to the amount of calcium chloride present in the product.

In testimony whereof we affix our signatures.

ANTHONY GEORGE.
ROBERT B. MacMULLIN.